United States Patent [19]

Davis et al.

[11] Patent Number: 4,513,795

[45] Date of Patent: Apr. 30, 1985

[54] TANK WITH SELECTIVELY VARIABLE AUTOMATIC OUTAGE

[75] Inventors: Edward L. Davis, Youngstown; Erling Mowatt-Larssen, Warren, both of Ohio

[73] Assignee: General American Transportation Corporation, Chicago, Ill.

[21] Appl. No.: 496,576

[22] Filed: May 20, 1983

[51] Int. Cl.³ .................. B65B 31/00; F17D 1/00
[52] U.S. Cl. ...................... 141/35; 141/98; 141/198; 141/288; 137/575
[58] Field of Search ................ 141/285–310, 141/35, 198, 346, 98, 347–359, 231–233, 36, 67, 141/100, 105, 99, 236, 237, 242, 243, 244, 385, 386, 141/387; 137/587–589, 575; 105/1 A

[56] References Cited

U.S. PATENT DOCUMENTS

| | | | |
|---|---|---|---|
| 424,259 | 3/1890 | Beman | 141/288 |
| 2,884,021 | 4/1959 | Ginsburg | 141/288 |
| 3,548,779 | 6/1979 | Green | 141/95 |
| 3,897,807 | 8/1975 | Hurst et al. | 141/98 |
| 3,989,059 | 11/1976 | Price et al. | 137/347 |
| 4,002,192 | 1/1977 | Mowatt-Larssen | 141/35 |
| 4,007,766 | 2/1977 | Hurst | 141/98 |
| 4,008,739 | 2/1977 | Hurst et al. | 141/35 |
| 4,079,760 | 3/1978 | Hurst | 141/35 |
| 4,304,271 | 12/1981 | Mowatt-Larssen | 141/98 |

Primary Examiner—Houston S. Bell, Jr.
Attorney, Agent, or Firm—Emrich & Dithmar

[57] ABSTRACT

The tank of a railway tank car has two top-mounted lading conduits coupled thereto in fluid communication therewith. One of the lading conduits has the inner end thereof disposed at the minimum fill level of the tank. A vapor vent fitting is also formed in the tank, to which any one of a plurality of different-length vent pipes can selectively removably be mounted with the inner ends thereof disposed at different levels between the maximum and minimum fill levels of the tank. The vent pipe communicates with the one lading conduit above the maximum fill level of the tank. An access opening is provided so that the vent pipe can be reached and changed from outside the tank.

In one embodiment the vent pipe communicates with the one lading conduit inside the tank and access thereto is had through the one lading conduit. In another embodiment the vent pipe communicates with the one lading conduit inside the tank, but access thereto is had through a separate access opening in the tank. In a third embodiment the vent pipe communicates with the one lading conduit outside the tank. A special tool is provided for facilitating mounting and demounting of the interchangeable vent pipes from outside the tank.

20 Claims, 10 Drawing Figures

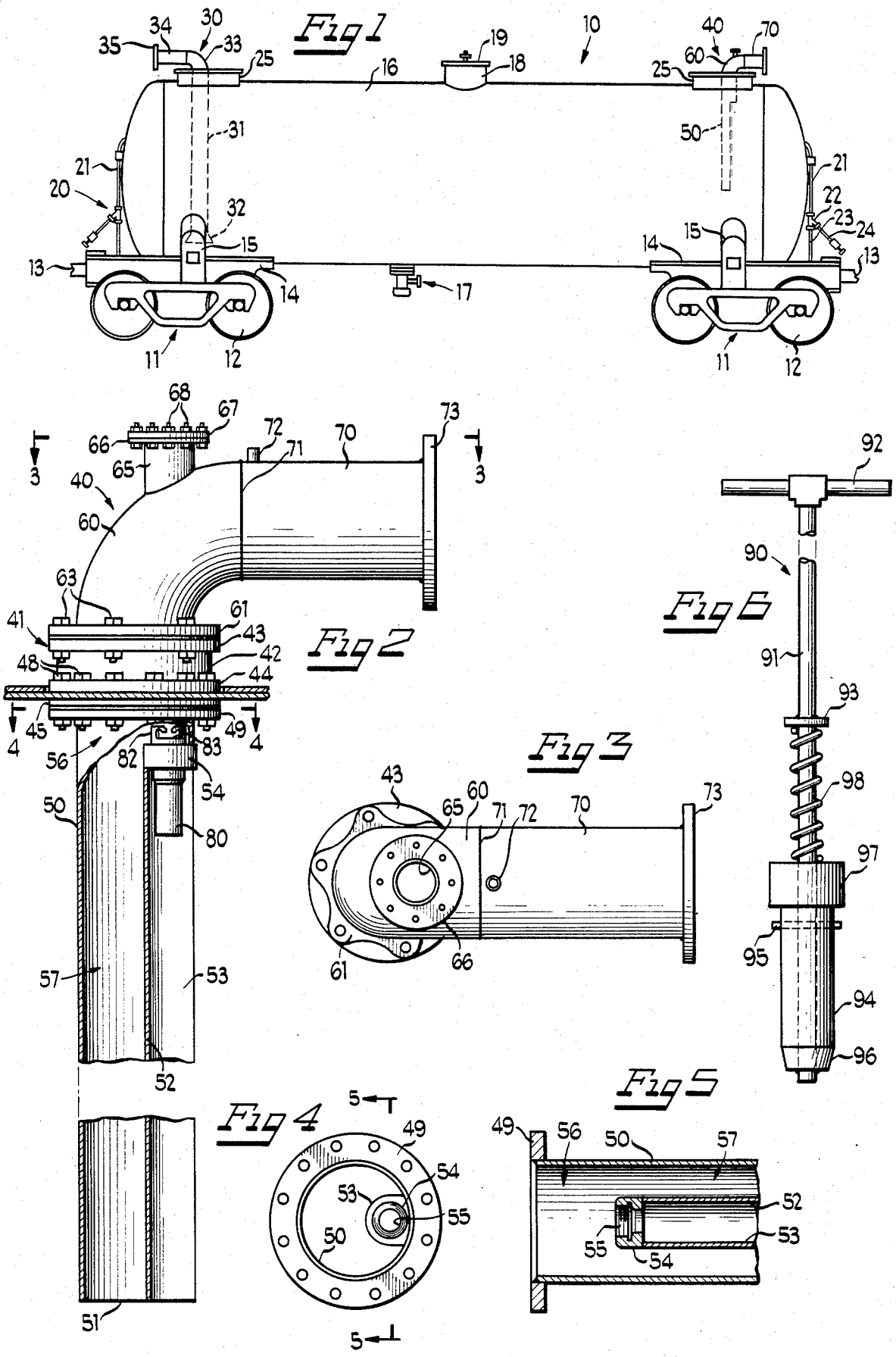

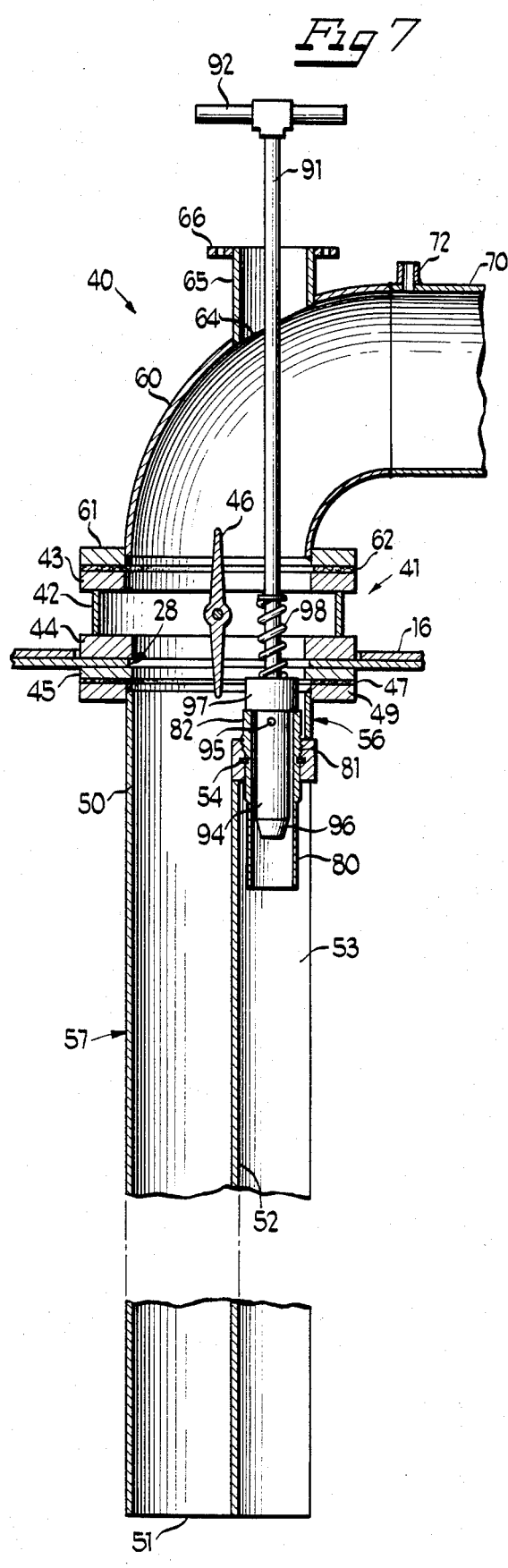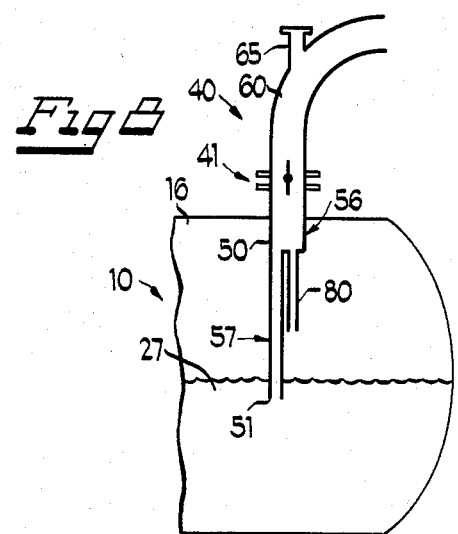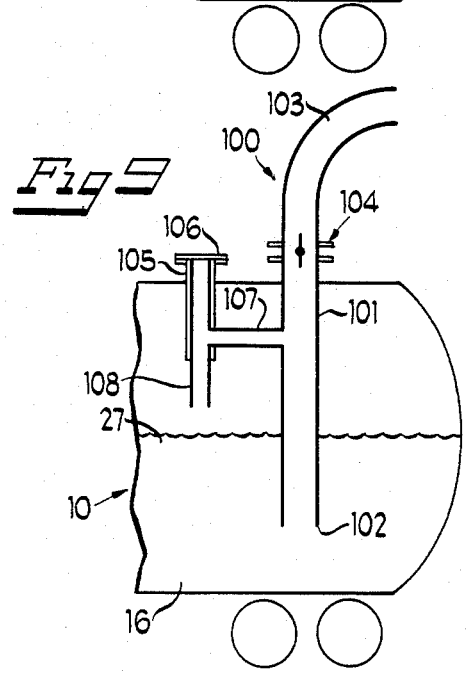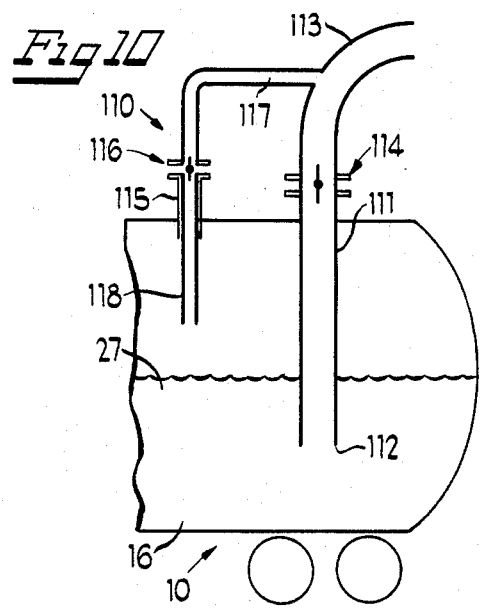

4,513,795

TANK WITH SELECTIVELY VARIABLE AUTOMATIC OUTAGE

BACKGROUND OF THE INVENTION

The present invention relates to tanks, and in particular to railway tank cars of the manifolded type which may be interconnected to accommodate loading or unloading of an entire train of interconnected cars without movement thereof, from a single point therealong, thereby accommodating consecutive loading, transporting and unloading of fluid ladings and facilitating the formation of unit trains.

Manifolded railway tank cars have been designed with two top-located lading conduits having internal downward extensions of different lengths within the tank. The longer of the two lading conduits typically terminates closely adjacent to the bottom of the tank and permits unloading of liquid from the tank to an almost empty condition. The shorter of the two lading conduits has the inner end thereof spaced closely adjacent to the top of the tank and limits the liquid fill level when the tank is loaded through the other lading conduit. Such a manifolded tank car is disclosed, for example, in U.S. Pat. No. 3,897,807.

Typically, the tank car is designed to be filled to a maximum level which leaves a certain amount of free space or "outage" at the top of the tank above the liquid lading, typically in the range of about 2% of the total volume of the tank. This outage accommodates vapors formed above the liquid lading. The maximum fill level is determined by the level of the inner end of the shorter lading conduit, since when the surface of the liquid reaches this level it closes the shorter lading conduit and prevents the further escape of vapors therethrough. Thus, the vapors are confined to the very small volume of the "outage" and are compressed, this pressure forcing the liquid up through the shorter lading conduit and to the next tank car for filling thereof.

If a tank car is to be used to transport a specific liquid exclusively, the tank is sized so that when filled to a 2% outage the car weight is at the load limit weight. If a greater density liquid were to be transported, a lesser volume of liquid would bring the car to is load limit and, therefore, the maximum fill height would be less resulting in an outage greater than 2%. Accordingly, when a train of tank cars is to be filled automatically and consecutively from one end of the train with a particular liquid lading, it is necessary that the shorter lading conduits of each of the tanks terminate at the proper maximum fill level for that lading. Accordingly, prior tank cars have had the lading conduits thereof designed for a particular lading, so that different tank car constructions had to be used for ladings of different densities. This greatly impaired the utility of a tank car and tremendously increased the numbers of cars which had to be maintained to accommodate different types of ladings.

SUMMARY OF THE INVENTION

It is a general object of the present invention to provide an improved railway tank car and tank therefor, which avoids the disadvantages of prior tank cars while affording additional structural and operating advantages.

An important object of this invention is the provision of a simple mechanical means for changing the automatic fill level of a tank.

In connection with the foregoing object, it is another object of this invention to provide means whereby the tank's automatic fill level can be changed from outside the tank.

It is another object of this invention to provide a railway tank car utilizing a tank of the type set forth.

It is still another object of this invention to provide a tank car of the type set forth which can be achieved with only minor modifications to a standard manifolded tank car.

It is yet another object of this invention to provide a manifolded railway tank car which can be automatically filled in series with a train of like tank cars from one end thereof with any of several different density ladings, without major modifications to the tank.

These and other objects of the invention are attained by providing a tank for liquid ladings including two lading conduits coupled to the tank in fluid communication therewith and each extending outwardly therefrom adjacent to the top thereof, one of the lading conduits having the inner end thereof disposed at the minimum fill level of the tank, the improvement comprising: vent conduit means coupled to the tank in parallel with the one lading conduit, the vent conduit means communicating with the one lading conduit above or at the maximum fill level of the tank and having the inner end thereof disposed within the tank at a predetermined desired fill level between the maximum and minimum fill levels of the tank, and means for varying the level at which the inner end of the vent conduit means is disposed thereby to vary the predetermined fill level of the tank.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a side elevational view of a railway tank car constructed in accordance with and embodying the features of a first embodiment of the present invention;

FIG. 2 is an enlarged side elevational view of the lading vent conduit assembly of the tank car of FIG. 1 with portions broken away more clearly to show the construction;

FIG. 3 is a top plan view of the lading vent conduit assembly of FIG. 2;

FIG. 4 is a view in horizontal section taken along the line 4—4 in FIG. 2;

FIG. 5 is a fragmentary view in vertical section taken along the line 5—5 in FIG. 4;

FIG. 6 is an enlarged side elevational view of a tool for use with the present invention;

FIG. 7 is a further enlarged view in vertical section of the lading vent conduit assembly of FIG. 2, illustrating the use of the tool of FIG. 6;

FIG. 8 is a fragmentary diagrammatic view of a portion of the tank car of FIG. 1 illustrating the operation of the embodiment of FIG. 1;

FIG. 9 is a view similar to FIG. 8, illustrating an alternative embodiment of the present invention; and FIG. 10 is a view similar to FIG. 8, illustrating still another embodiment of the present invention.

DESCRIPTION OF THE PREFERRED EMBODIMENTS

Referring to FIG. 1 of the drawings, there is illustrated, a railway tank car, generally designated by the numeral 10. The tank car 10 includes a pair of trucks 11 respectively disposed at the opposite ends thereof and each provided with pairs of rail wheels 12 for rolling engagement with the rails of a standard railway track. Each tank car 10 is further provided with a coupler 13 at each end thereof for coupling adjacent tank cars together in tandem relationship. Mounted on each of the trucks 11 is a longitudinally extending center sill 14 and an arcuate saddle bolster 15 for supporting thereon one end of an associated tank 16, all in a well known manner. The tank 16 is provided at the bottom thereof with a loading and unloading assembly, generally designated by the numeral 17, and is provided at the top thereof intermediate the ends thereof with a cylindrical manway 18 closed by a manway cover 19, all in a known manner.

The tank car 10 is provided with a pneumatic system, generally designated by the numeral 20 which includes a network of air conduits, including a main conduit 21 extending longitudinally along one side of the tank 16 adjacent to the top thereof and externally thereof and down along the end walls thereof, the main line 21 being connected to two Y-couplers 22, respectively disposed at the opposite ends of the tank 16. Each of the Y-couplers 22 is in turn connected by a chassis line 23 to the rest of the pneumatic system 20 on the tank car 10 and by a inter-tank connecting line 24 to the pneumatic systems 20 of adjacent cars, all in standard fashion. The tank 16 is provided at the top thereof with two cylindrical valve protective housings 25, respectively disposed adjacent to the opposite ends thereof, for a purpose to be described more fully below.

The tank 16 is adapted for carrying a liquid lading 27 therein (see FIG. 8), which lading may be loaded into and/or removed from the tank 16 via the loading and unloading assembly 17. Alternatively, the lading 17 may be loaded and unloaded from the top of the tank 16. For this purpose there is provided a lading eduction conduit, generally designated by the numeral 30, which includes an elongated cylindrical pipe 31 extending through a complementary opening in the top of the tank 16 within one of the valve protective housings 25 and is fixedly secured to the tank 16 at that location, the inner end 32 of the pipe 31 being disposed closely adjacent to the bottom of the tank 16. The upper end of the pipe 31 is connected to an elbow 33, which is in turn connected to a horizontal pipe section 34 projecting toward the adjacent end of the tank 16 and provided at its distal end with a coupling flange 35 to facilitate coupling of the lading eduction conduit 30 to one end of a flexible connecting conduit (not shown) for providing interconnection between adjacent tank cars 10. When the tank 16 is emptied through the lading eduction system 30, it can be emptied to the level of the inner end 32 of the pipe 31. The lading eduction conduit 30 includes a valve (not shown) disposed outside the tank 16 for opening and closing the conduit 30.

There is also provided a lading vent conduit assembly, generally designated by the numeral 40, which is disposed at the other end of the tank 16. Referring now also to FIGS. 2 through 5 and 8 of the drawings, the lading vent conduit assembly 40 includes a butterfly valve assembly, generally designated by the numeral 41, which includes a cylindrical housing 42 provided at the upper and lower ends thereof, respectively, with annular attachment flanges 43 and 44. The flange 44 is seated on the top of the tank 16 in surrounding relationship with a complementary circular opening 28 therein (see FIG. 7). Surrounding the opening 28 along the inner surface of the tank 16 is an annular flange 45. Mounted for pivotal movement within the housing 42 is a butterfly valve member 46 (FIG. 7) which may be pneumatically operated in a well known manner. A gasket seal 47 is disposed between the inner flange 45 and a mounting flange 49 fixedly secured to the upper end of a lading pipe section 50. The flanges 44, 45 and 49 are secured together along with the gasket seal 47 by a plurality of bolts 48 (FIG. 2).

The lading pipe section 50 extends substantially vertically downwardly into the tank 16, terminating at an inner end 51 which is preferably disposed at the minimum fill level of the tank 16, i.e., the minimum level to which the tank will ever be filled. The lading pipe section 50 is substantially in the form of a circular cylinder and has a rectangular cutout 52 extending longitudinally along one side thereof from a point a predetermined distance below the flange 49 to the inner end 51. The upper end of the cutout 52 is disposed substantially at the maximum fill level of the tank 16, i.e., the maximum level to which the tank will ever be filled. Disposed in the cutout 52 and fixedly secured to the lading pipe section 50 is an elongated concave sleeve 53, which is substantially U-shaped in transverse cross section. More specifically, referring in particular to FIGS. 2, 4 and 5, the longitudinal edges of the sleeve 53 are respectively fixedly secured, as by welding, to the edges of the lading pipe section 50 along the cutout 52 to form a fluid-tight seal therewith. The upper end of the sleeve 53 is closed by a fitting 54 having an internally threaded bore 55 extending vertically therethrough. Thus, it can be seen that the sleeve 53 and fitting 54 serve to divide the lading pipe section 50 into an upper relatively large-diameter portion 56 above the level of the fitting 54 and a portion 57 below the level of the fitting 54 which is of relatively small internal cross-sectional area.

The valve assembly 41 is connected to an elbow 60 above the tank 16. More particularly, the elbow 60 has an annular attachment flange 61 which cooperates with the attachment flange 43 for securely clamping therebetween a gasket seal 62 (see FIG. 7), the parts being secured together by bolts 63. Formed in the upper wall of the elbow 60 is an access opening 64. Fixedly secured, as by welding, to the elbow 60 in surrounding relationship with the opening 64 and extending upwardly therefrom coaxially therewith and with the bore 55 in the fitting 54 is a cylindrical access pipe 65 provided at the upper end thereof with an annular attachment flange 66, which is secured as by bolts 68 to a circular cover 67. The outer end of the elbow 60 is secured, as by a weldment 71, to a horizontal pipe section 70 provided with a vent opening 72 therein. The distal end of the pipe section 70 is provided with an annular coupling flange 73 to facilitate coupling to an adjacent end of a connecting conduit (not shown) for connecting the lading vent conduit assembly 40 to the lading eduction conduit 30 of an adjacent tank car 10.

A vent pipe 80 is mountable on the fitting 54 for establishing the maximum fill level of the tank 16. In particular, the vent pipe 80 comprises an elongated straight tubular pipe having an externally threaded portion 81 (FIG. 7) intermediate the ends thereof. The vent pipe 80 is threadedly engaged in the bore 55 of the fitting 54 coaxially therewith so that the axis of the vent pipe 80 is disposed substantially parallel to the longitudinal axis of the lading pipe section 50. The vent pipe 80 also includes a locking flange at the upper end thereof which projects upwardly a predetermined distance above the fitting 54 when the vent pipe 80 is mounted in place in the fitting 54. The locking flange is provided with two diametrically spaced-apart locking slots 83 in the upper edge thereof, each of the locking slots 83 being generally in the shape of an inverted T, as can best be seen in FIG. 2. It is significant that the outer diameter of the vent pipe 80 is less than half the inner diameter of the lading pipe section 50 and the elbow 60.

Referring in particular to FIGS. 6 and 7 of the drawings, there is also provided a tool, generally designated by the numeral 90, which includes an elongated shaft 91 provided at one end thereof with a transversely extending handle 92. Fixedly secured to the shaft 91 in surrounding relationship therewith intermediate the ends thereof is an annular retaining collar 93. Fixedly secured to the shaft 91 coaxially therewith at the other end thereof is a cylindrical spacer 94, provided at its upper end with a fixed pin 95 extending diametrically thereof and projecting laterally outwardly therefrom. The outer diameter of the spacer 94 is slightly less than the inner diameter of the vent pipe 80, while the length of the pin 95 is greater than the inner diameter of the vent pipe 80. The spacer 94 is provided with a tapered end 96 closest to the adjacent end of the shaft 91. Disposed in surrounding relationship with the shaft 91 and freely slidable with respect thereto between the retaining collar 93 and the spacer 94 is an annular slide block 97, the outer diameter of which is greater than the inner diameter of the vent pipe 80. A helical compression spring 98 surrounds the shaft 91 between the retaining collar 93 and the slide block 97.

Referring now in particular to FIGS. 1, 7 and 8 of the drawings, the operation of the tank car 10 will be described in detail. Normally a vent pipe 80 suitable for the particular lading to be carried will be mounted in place on the fitting 54 and the cover 67 will be securely fastened on the access pipe 65. The lower end of the vent pipe 80 defines the maximum fill level of the tank 16. Typically, the tank car 10 will be interconnected in a train of a plurality of like tank cars in the manner described above and as explained in greater detail in the aforementioned U.S. Pat. No. 3,897,807.

When it is desired to load the tank cars 10 of the tank train, the valve assembly 41 of each tank car 10 is moved to the open position, illustrated in FIG. 7, and the valves in the lading eduction conduits 30 are similarly opened, preferably simultaneously by the pneumatic system 20. Liquid lading is then introduced under pressure into the lading eduction conduit 30 of the tank car 10 at one end of the train. As the level of the liquid lading 27 rises in the tank 16, air and vapor is displaced and forced out through the lading vent conduit assembly 40 to the next tank car 10. When the level of the liquid lading 27 reaches the inner end 51 of the lading pipe section 50, it closes the portion 57 of the lading pipe section 50 and prevents the further escape of vapors therethrough. However, vapors can still be forced out through the vent pipe 80.

The level of the liquid lading 27 continues to rise in the tank 16 and within the portion 57 of the lading pipe section 50 until it reaches the lower end of the vent pipe 80, closing same. At this point there is no longer an escape path for the vapors in the tank 16, which are compressed in the "outage" space between the top of the tank and the lower end of the vent pipe 80, as more lading is introduced into the tank 16, this pressure forcing the lading out through the lading pipe section 50 and the vent pipe 80 to the next tank car 10, which is then filled in the same manner. Preferably, the last tank car 10 in the train is only partially filled. Thus, after the source of liquid lading is disconnected from the first tank car 10, a source of pressurized gas can be connected thereto for forcing the liquid lading from the inter-car connecting conduits, the free space in the last tank car 10 being sufficient to accept all of the lading emptied from the connecting conduits along the entire length of the train, as is described in greater detail in the aforementioned U.S. Pat. No. 3,897,807. When the loading operation is thus completed, the valve assemblies 41 and the valves in the lading eduction conduits 30 are all simultaneously closed by the pneumatic system 20 to prevent escape of liquid lading from the tank car 10 during transit.

After the train has reached its destination, the tank cars 10 may be unloaded by connecting the lading eduction conduit 30 at one end of the train to an associated liquid lading reservoir or other storage facility by suitable connecting means. At this point, the valve assemblies 41 and the valves of the lading eduction conduits 30 are all simultaneously automatically opened. The tank 16 at the opposite end of the train is pressurized with an appropriate gas, as through the lading vent conduit assembly 40, so that the liquid lading therein will be forced upwardly through the lading eduction conduit 30 to the next adjacent tank car 10 and, at the same time, liquid lading will be forced from the tank car 10 at the other end of the train into the storage facility, thus to unload serially the entire train of tank cars 10.

It is a significant aspect of the present invention that the same tank cars 10 can be readily utilized for transportation of other liquid ladings of different densities. In this regard, there are provided for each tank car 10 a plurality of interchangeable vent pipes 80 of varying lengths for respectively defining different maximum fill levels and corresponding different "outages" for the several different density ladings to be transported. If desired, these interchangeable vent pipes 80 could all be carried in suitable racks or other storage facilities on the outside of the tank 16. In order to change the vent pipe 80 in a tank car 10, the valve assembly 41 is first moved to the open condition, illustrated in FIG. 7, and the cover 67 is removed from the access pipe 65. The spacer end of the tool 90 is the inserted downwardly through the access pipe 65 and the open valve assembly 41 and into the upper end of the vent pipe 80. The slide block 97 has a diameter such that it will not enter the vent pipe 80, but the shaft 91 of the tool 90 can be further depressed into the vent pipe 80 against the urging of the compression spring 98 for moving the opposite ends of the pin 95 respectively into the necks of the T-shaped locking slots 83, the shaft 91 having been rotated the desired amount to bring the pin 95 into alignment with the locking slots 83. When the pin 95 has reached the bottom of the locking slots 83, the shaft 91 is rotated in a counterclockwise direction to move the ends of the pin 95 into the arms of the T-shaped locking slots 83 and unscrew the vent pipe 80 from the fitting 54. When the vent pipe 80 has been disengaged it is then pulled out through the access pipe 65 with the tool 90.

The new vent pipe 80 is then fitted onto the spacer 94 of the tool 90, the pin 95 being rotated to bring the ends thereof into alignment with the T-shaped locking slots 83. The shaft 91 is depressed sufficiently to push the pin 95 into the slots 83 and then rotated in a clockwise direction to lock the pin 95 in place. The tool 90 with the vent pipe 80 mounted thereon is then inserted back down through the access pipe 65 and the open valve assembly 41 and through the bore 55 in the fitting 54. The vent pipe 80 is then screwed into engagement with the fitting 54 by further clockwise rotation of the shaft 91. The shaft 91 is then depressed and rotated slightly counterclockwise for disengaging the pin 95 from the locking slots 93 and the tool 90 is retracted. The access pipe cover 67 is then replaced and the tank car 10 is then ready for loading with the new liquid lading. Thus, it can be seen that the present invention provides a simple mechanical means for readily adjusting the maximum fill level of a tank car 10 from outside the tank 16.

It will be noted that in the embodiment of FIGS. 1 and 8, the vent pipe 80 is disposed entirely within the maximum diameter of the lading pipe section 50. This is a significant advantage because it necessitates only a single opening in the tank 16 to accommodate the lading vent conduit assembly 40. This permits simple modification of an existing standard manifolded tank car of the type disclosed in the aforementioned U.S. Pat. No. 3,897,807, without having to form any additional openings in or otherwise modify the tank shell. Accordingly, the manifolded tank car of the type disclosed in that prior patent can readily be converted to incorporate the present invention by simply substituting the new lading vent conduit assembly 40 described above for the old lading vent conduit assembly.

However, it will be appreciated that other arrangements could be used and may well be desirable in the case of manufacture of new tank cars 10. In such cases it may be advantageous to space the vent pipe from the lading pipe of the lading vent conduit assembly so as not to reduce the cross-sectional area of the lading vent conduit assembly. Referring to FIG. 9, there is illustrated another embodiment of the lading vent conduit assembly of the present invention, generally designated by the numeral 100. The lading vent conduit assembly 100 includes an elongated lading pipe 101 extending through a complementary opening in the tank 16 and having an inner end 102 disposed at the minimum fill level of the tank. The upper end of the lading pipe 101 projects above the tank 16 and communicates with an elbow 103 through a butterfly valve 104. There is also provided an access pipe 105 which is disposed through another opening in the tank 16 with the longitudinal axis thereof disposed substantially parallel to that of the lading pipe 101, the access pipe 105 being provided with a cover 106. The access pipe 105 communicates with the lading pipe 101 inside the tank 16 and above the maximum fill level thereof through a branch pipe 107. A vent pipe 108 is insertable coaxially into the access pipe 105 and may be secured in place as by threaded engagement or other suitable means, such as telescoping or retracting through a compressive seal, so that the inner end of the access pipe 105 is disposed at the maximum fill level of the tank 16. A plurality of interchangeable vent pipes 108 of varying lengths are provided so that, when mounted in place, the inner ends thereof are disposed at various levels between the inner end of the access pipe 105 and the inner end of the lading pipe 101 to define different maximum fill levels of the tank 16 between the inner end of the access pipe 105 and the inner end 102 of the lading pipe 101.

The operation of the lading vent conduit assembly 100 is substantially the same as was described above with respect to the lading vent conduit assembly 40, with the exception that the vapors pass into the lading pipe 101 and the elbow 103 from the vent pipe 108 through the branch 107.

Referring now also to FIG. 10 of the drawings, there is illustrated still another embodiment of the lading vent conduit assembly of the present invention, generally designated by the numeral 110. The lading vent conduit assembly 110 includes a lading pipe 111 which extends through a complementary opening in the top of the tank 16, the inner end 112 of the lading pipe 111 being disposed at the minimum fill level of the tank 16. The upper end of the lading pipe 111 is disposed outside the tank 16 and communicates with an elbow 113 through a butterfly valve 114. Also disposed through another opening in the top of the tank 16 is an access pipe 115 having the longitudinal axis thereof disposed substantially parallel to that of the lading pipe 111. The upper end of the access pipe 115 is disposed outside the tank 16 and communicates through a butterfly valve 116 with a branch pipe 117, which is in turn disposed in communication with the elbow 113. Preferably, the branch pipe 117 is separable from the access pipe 115 at the valve 116 to permit the insertion into the access pipe 115 of a vent pipe 118, which may secured in place as by threaded engagement or other suitable means, such as telescoping or retracting through a compressive seal. The inner end of the access pipe 115 is disposed at the maximum fill level of the tank 16. There are provided a plurality of interchangeable vent pipes 118 of varying lengths, so that the inner ends thereof define different maximum fill levels of the tank 16 between the inner end of the access pipe 115 and the inner end 112 of the lading pipe 111.

The operation of the lading vent conduit assembly 110 is essentially the same as was described above with respect to the lading vent conduit assembly 100 of FIG. 9. The additional valve 116 is necessary for safety reasons because of the interconnection between the access pipe 115 and the elbow 113 outside the tank 16.

From the foregoing, it can be seen that there has been provided an improved manifolded railway tank car which permits simple changing of the maximum fill level of the tank from outside the tank by mechanical replacement of interchangeable vent pipes.

We claim:

1. In a tank for liquid ladings adapted for interconnection and fluid communication with associated like tanks by connecting conduits for accommodating loading of liquid ladings into the tanks consecutively in series, wherein the tank includes two lading conduits coupled to the tank in fluid communication therewith and each extending outwardly therefrom adjacent the top thereof, one of the lading conduits having the inner end thereof disposed at the minimum fill level of the tank, the improvement comprising: vent conduit means coupled to the tank in parallel with the one lading conduit, said vent conduit means communicating directly with the one lading conduit at or above the maximum fill level of the tank and having the inner end thereof disposed within the tank at a predetermined desired fill level between the maximum and minimum fill levels of the tank, and means for varying the level at which said inner end of said vent conduit means is disposed thereby to vary the predetermined fill level of the tank.

2. The tank of claim 1, and further including means on the tank for providing access to said vent conduit means from outside the tank to permit varying the level of the inner end of said vent conduit means from outside the tank.

3. The tank of claim 1, wherein said vent conduit means communicates with the one lading conduit at a point inside the tank.

4. The tank of claim 1, wherein said vent conduit means communicates with the one lading conduit at a point outside the tank.

5. The tank of claim 1, wherein said varying means includes interchangeable conduit members of different lengths selectively removably mountable in the tank.

6. The tank of claim 5, and further including a mounting tool engageable with each of said conduit members for facilitating mounting and demounting thereof.

7. The tank of claim 5, and further including means on the tank for providing access to the vent conduit means from outside the tank to permit interchanging of said conduit members from outside the tank.

8. The tank of claim 1, wherein said one lading conduit has a first portion of relatively large cross-sectional area and a second portion of relatively small cross-sectional area, said first portion having an outer end extending outwardly from the tank adjacent to the top thereof and an inner end extending inwardly of the tank to the maximum fill level thereof, said second portion extending from the inner end of said first portion downwardly to the minimal fill level of the tank, said first portion having a vent opening at the inner end thereof completely within the perimeter thereof and outside the perimeter of said second portion, said vent conduit means communicating with said first portion at the vent opening therein.

9. In a railway tank car having a tank adapted for interconnection and fluid communication with the tanks of associated like tank cars by connecting conduits for accommodating loading of liquid ladings into the tanks consecutively in series, wherein the tank includes two lading conduits coupled thereto in fluid communication therewith and each extending outwardly therefrom adjacent to the top thereof for coupling to an associated connecting conduit, one of the lading conduits having the inner end thereof disposed at the minimum fill level of the tank, the improvement comprising: vent conduit means coupled to the tank in parallel with the one lading conduit, said vent conduit means communicating directly with the one lading conduit at or above the maximum fill level of the tank and having the inner end thereof disposed within the tank at a predetermined desired fill level between the maximum and minimum fill levels of the tank, and means for varying the level at which said inner end of said vent conduit means is disposed thereby to vary the predetermined fill level of the tank.

10. The railway tank car of claim 9, and further including valve means disposed in the one lading conduit outside the tank for opening and closing the one lading conduit.

11. The railway tank car of claim 9, wherein the other lading conduit has the inner end thereof disposed closely adjacent to the bottom of the tank.

12. The railway tank car of claim 9, and further including means on the tank for providing access to said vent conduit means from outside the tank to permit varying the level of the inner end of said vent conduit means from outside the tank.

13. The railway tank car of claim 9, wherein said vent conduit means communicates with the one lading conduit at a point inside the tank.

14. The railway tank car of claim 9, wherein said vent conduit means includes interchangeable conduit members of different lengths selectively removably mountable in the tank.

15. In a railway tank car having a tank adapted for interconnection and fluid communication with the tanks of associated like tank cars by connecting conduits for accommodating loading of liquid ladings into the tanks consecutively in series, wherein the tank includes a first lading conduit coupled thereto in fluid communication therewith and extending outwardly therefrom adjacent to the top thereof for connection to one of the associated connecting conduits, the improvement comprising: a second lading conduit coupled to the tank in fluid communication therewith, said second lading conduit having a first portion of relatively large cross-sectional area and a second portion of relatively small cross-sectional area, said first portion having an outer end extending outwardly from the tank adjacent to the top thereof for connection to another one of the associated connecting conduits and an inner end extending inwardly of the tank to the maximum fill level thereof, said second portion extending from the inner end of said first portion downwardly to the minimum fill level of the tank, said first portion having a vent opening at the inner end thereof completely within the perimeter thereof and outside the perimeter of said second portion, vent conduit means coupled to said second lading conduit in parallel with said second portion thereof, said vent conduit means communicating directly with said first portion of said second lading conduit at the vent opening therein and having an inner end disposed within the tank at a predetermined desired fill level between the maximum and minimum fill levels of the tank, and means for varying the level at which said inner end of said vent conduit means is disposed thereby to vary the predetermined fill level of the tank.

16. The railway tank car of claim 15, wherein said varying means includes interchangeable conduit members of different lengths selectively removably mountable on said second lading conduit at said vent opening therein.

17. The railway tank car of claim 16, wherein said conduit members are threadedly engageable with said second conduit means.

18. The railway tank car of claim 17, and further including a mounting tool engageable with each of said conduit members for facilitating threaded engagement and disengagement thereof with respect to said second lading conduit.

19. The railway tank car of claim 16, and further including means on the second lading conduit providing access to said vent opening from outside the tank for permitting mounting and demounting of said conduit members from outside the tank.

20. The railway tank car of claim 15, wherein said second lading conduit has an elongated opening in the side thereof extending from the maximum fill level to the minimum fill level of the tank, and a concave sleeve disposed in said opening and fixedly secured to said second lading conduit along the entire length of said elongated opening for cooperation with said second lading conduit to define the second portion thereof.

* * * * *